United States Patent
Pourreza Shahri et al.

(10) Patent No.: US 10,992,873 B2
(45) Date of Patent: Apr. 27, 2021

(54) SYSTEMS AND METHODS FOR COLOR MATCHING FOR REALISTIC FLASH IMAGES

(71) Applicant: QUALCOMM Incorporated, San Diego, CA (US)

(72) Inventors: Reza Pourreza Shahri, San Diego, CA (US); Ramin Rezaiifar, Del Mar, CA (US)

(73) Assignee: Qualcomm Incorporated, San Diego, CA (US)

(*) Notice: Subject to any disclaimer, the term of this patent is extended or adjusted under 35 U.S.C. 154(b) by 132 days.

(21) Appl. No.: 16/294,907

(22) Filed: Mar. 6, 2019

(65) Prior Publication Data
US 2020/0236270 A1 Jul. 23, 2020

Related U.S. Application Data

(60) Provisional application No. 62/794,338, filed on Jan. 18, 2019.

(51) Int. Cl.
| | |
|---|---|
| *H04N 5/235* | (2006.01) |
| *G06F 9/30* | (2018.01) |
| *G06T 7/90* | (2017.01) |
| *H04N 13/254* | (2018.01) |

(52) U.S. Cl.
CPC ......... *H04N 5/2354* (2013.01); *G06F 9/3004* (2013.01); *G06T 7/90* (2017.01); *H04N 13/254* (2018.05); *G06T 2207/20172* (2013.01)

(58) Field of Classification Search
CPC ...... H04N 5/2354; H04N 13/254; G06T 7/90; G06T 7/3004; G06T 2207/20172
See application file for complete search history.

(56) References Cited

U.S. PATENT DOCUMENTS

| | | | | |
|---|---|---|---|---|
| 9,154,708 | B1* | 10/2015 | Rivard | H04N 5/3559 |
| 2007/0025720 | A1* | 2/2007 | Raskar | G06T 5/008 |
| | | | | 396/213 |
| 2011/0128282 | A1* | 6/2011 | Wang | G06T 7/97 |
| | | | | 345/419 |
| 2011/0205395 | A1* | 8/2011 | Levy | H04N 5/23229 |
| | | | | 348/229.1 |
| 2015/0312503 | A1* | 10/2015 | Sato | H04N 9/045 |
| | | | | 348/308 |
| 2018/0061009 | A1* | 3/2018 | Gren | G06T 5/50 |
| 2018/0134127 | A1* | 5/2018 | Winn | H05B 45/20 |

\* cited by examiner

*Primary Examiner* — Antoinette T Spinks
(74) *Attorney, Agent, or Firm* — Qualcomm Incorporated

(57) ABSTRACT

Systems, methods, and computer-readable media are provided for transferring color information from a no-flash image of a scene to a flash image of the scene using a localized tonal mapping algorithm. In some aspects, an example method can include obtaining a no-flash image and a flash image, mapping color information from the no-flash image to the flash image, and generating an output image including the flash image modified based on the mapping to include at least a portion of the color information from the no-flash image.

25 Claims, 10 Drawing Sheets

300

No-Flash Image with Low Light Conditions

310

320

SYSTEMS AND METHODS FOR COLOR MATCHING FOR REALISTIC FLASH IMAGES

CROSS-REFERENCE TO RELATED APPLICATIONS

This application claims the benefit of, and priority to, U.S. Provisional Patent Application No. 62/794,338 filed on Jan. 18, 2019, entitled "SYSTEMS AND METHODS FOR COLOR MATCHING FOR REALISTIC FLASH IMAGES", the contents of which are hereby expressly incorporated by reference in their entirety.

TECHNICAL FIELD

The present disclosure generally relates to techniques and systems for processing flash images.

BACKGROUND

The increasing versatility of image data capturing products, such as digital cameras, has allowed image data capturing capabilities to be integrated into a wide array of devices. Users can capture video and/or images from any device equipped with such image data capturing capabilities. For example, a user can use a camera to capture images of a scene for recreational use, professional photography, surveillance, among other applications. The image data capturing devices can capture images and output the image data for processing and/or consumption.

Image capturing devices today generally provide an assortment of settings that a user can configure to adjust the quality and characteristics of captured images. For example, image capturing devices often have a flash setting that a user can enable to produce flash images. Flash images are images produced using a flash of artificial light to help illuminate a scene being captured by the image. Flash images are typically used to illuminate a dark scene or provide a supplementary source of light when ambient light is inadequate. While flash images can help improve the quality of an image by providing additional lighting, they often suffer from incorrect or unnatural color caused by a dominant bluish tint. On the other hand, no-flash images can often appear blurry and noisy, and are generally inadequate for dark or low-light environments. Accordingly, effective techniques are needed for processing flash images to produce high-quality images suitable for dark, low-light, and other environments.

BRIEF SUMMARY

In some examples, systems, methods, and computer-readable media are described for processing one or more images and tonal mapping color information between flash images and no-flash images to generate output images that have improved noise, brightness, texture and color characteristics as compared to the flash and no-flash images. The technologies herein can thus produce high-quality images suitable for dark, low-light, and other environments.

For example, flash images can be used to illuminate a dark scene or provide a supplementary source of light when ambient light is inadequate. While flash images can help improve the quality of an image captured in a low-light environment by providing additional lighting, they often suffer from incorrect or unnatural color which can be caused by a dominant bluish tint. On the other hand, no-flash images can appear blurry and noisy, and are generally inadequate for dark or low-light environments. The technologies herein can leverage the respective benefits of flash and no-flash images, while avoiding one or more respective disadvantages of flash and no-flash images, to produce a higher quality flash image by transferring color information from the no-flash image to the flash image. The resulting output image can preserve the color information from the no-flash image and the texture from the flash image, while maintaining optimized lighting or brightness characteristics.

In some examples, an image processing system can obtain a flash image of a scene and a no-flash image of the scene, and using the flash image as a baseline, the image processing system can transfer the color information from the no-flash image to the flash image to generate a composite output that maintains color, texture, and brightness. The image processing system can apply a localized tonal mapping algorithm to tone map (and transfer) color information between the flash image and the no-flash image. In some examples, the image processing system can use a primary data structure and a secondary data structure, such as a primary and secondary 3D grid or tensor, to perform the localized tonal mapping.

The primary data structure can include multiple cells, each cell $c_i$ storing pixel statistics, such as averages or means, calculated for a patch of pixels from the flash image corresponding (the patch of pixels) to that cell and a patch of pixels from the no-flash image corresponding (the patch of pixels) to that cell. The pixel statistics in each cell can include pixel statistics of each color component (e.g., red (R), green (G), and blue (B) for RGB images) in the patch of pixels from the flash image and the no-flash image. The patch of pixels from the flash image stored in a cell can correspond to or match the patch of pixels from the no-flash image stored in that cell. Thus, the cell can store pixel values (e.g., means or averages) for the same patch of pixels contained in each of the flash and no-flash images.

Moreover, the secondary data structure can similarly include multiple cells, with each cell $c_k$ corresponding to, or matching, a respective cell in the primary data structure. Each cell $c_k$ in the secondary data structure can store weights or parameters ($\alpha$) associated with the patch of pixels corresponding to that cell and/or the corresponding cell in the primary data structure. The weights or parameters ($\alpha$) in the cell $c_k$ can be calculated based on a tonal mapping and weight or parameter approximation algorithm using the values stored in the respective cell $c_i$ of the primary data structure that corresponds to the cell $c_k$ in the secondary data structure. The image processing system can perform tonal mapping by applying a localized tonal mapping algorithm using the values stored in the primary and secondary data structures. For example, the image processing system can use the values in the primary data structure to calculate the weights or parameters ($\alpha$) in the secondary data structure, and can use the weights or parameters ($\alpha$) in the secondary data structure to alter the pixel values of the flash image.

According to at least one example, a method of processing a flash image and transferring color information from a no-flash image of a scene to a flash image of the scene is provided. The method can include obtaining a no-flash image and a flash image. In some examples, the no-flash image can be an image captured by an image data capturing device, such as a camera or an image sensor, with a flash setting disabled. In some examples, the flash image can be an image captured by the image data capturing device with the flash setting enabled. The method can also include mapping color information from the no-flash image to the flash image and generating an output image including the flash image modified based on the mapping to include at least a portion of the color information from the no-flash image. In some aspects, each pixel in the flash image can be mapped to at least a portion of the color information from the no-flash image using a first subset of pixels in the flash image and a second subset of pixels in the no-flash image.

In another example, an apparatus for processing one or more images and transferring color information from a no-flash image of a scene to a flash image of the scene is provided. The apparatus can include one or more processors and memory configured to store data corresponding to one or more flash images and one or more no-flash images. The one or more processors can be configured to obtain a no-flash image and a flash image. In some examples, the no-flash image can be an image captured by an image data capturing device, such as a camera or an image sensor, with a flash setting disabled. In some examples, the flash image can be an image captured by the image data capturing device with the flash setting enabled. In some aspects, the image data capturing device can be part of (or implemented by) the apparatus. In other aspects, the image data capturing device can be a device or component that is separate from, or external to, the apparatus.

The one or more processors can also be configured to map color information from the no-flash image to the flash image and generate an output image including the flash image modified based on the mapping to include at least a portion of the color information from the no-flash image. In some aspects, each pixel in the flash image can be mapped to at least a portion of the color information from the no-flash image using a first subset of pixels in the flash image and a second subset of pixels in the no-flash image.

In another example, a non-transitory computer-readable medium for processing one or more images and transferring color information from a no-flash image of a scene to a flash image of the scene is provided. The non-transitory computer-readable medium can include instructions stored thereon which, when executed by one or more processors, cause the one or more processors to obtain a no-flash image and a flash image, map color information from the no-flash image to the flash image, and generate an output image including the flash image modified based on the mapping to include at least a portion of the color information from the no-flash image. In some examples, the no-flash image can be an image captured by an image data capturing device, such as a camera or an image sensor, with a flash setting disabled. In some examples, the flash image can be an image captured by the image data capturing device with the flash setting enabled. In some aspects, each pixel in the flash image can be mapped to at least a portion of the color information from the no-flash image using a first subset of pixels in the flash image and a second subset of pixels in the no-flash image.

In another example, an apparatus for processing one or more images and transferring color information from a no-flash image of a scene to a flash image of the scene is provided. The apparatus includes means for obtaining a no-flash image and a flash image. In some examples, the no-flash image can be an image captured by an image data capturing device, such as a camera or an image sensor, with a flash setting disabled. In some examples, the flash image can be an image captured by the image data capturing device with the flash setting enabled. The apparatus can also include means for mapping color information from the no-flash image to the flash image and generating an output image including the flash image modified based on the mapping to include at least a portion of the color information from the no-flash image. In some cases, each pixel in the flash image can be mapped to at least a portion of the color information from the no-flash image using a first subset of pixels in the flash image and a second subset of pixels in the no-flash image.

In some aspects, mapping the color information from the no-flash image to the flash image by the method, apparatus, and computer-readable medium described above can include applying a tonal mapping algorithm to the flash image. The tonal mapping algorithm can map color components between the no-flash image and the flash image using a one or more data structures, such as one or more three-dimensional (3D) grids. For example, the tonal mapping algorithm can create a primary 3D grid and populate it with values calculated for respective color components from the no-flash image and the flash image, which the tonal mapping algorithm can use to perform tonal mapping between the flash image and the no-flash image. The primary 3D grid can include two spatial dimensions (x, y), such as a horizontal dimension and a vertical dimension, and a luminance dimension (z). In some cases, the primary 3D grid can include multiple layers of cells, each layer corresponding to a different combination of horizontal, vertical and luminance states or values associated with the horizontal dimension, the vertical dimension, and the luminance dimension (x, y, z).

In some aspects, the at least one method, apparatus, and a computer-readable medium described above can further include aligning and/or down-sampling the flash image and the no-flash image, and generating the primary 3D grid based on a result of the aligning and down-sampling of the flash image and the no-flash image. In some aspects, the at least one method, apparatus, and a computer-readable medium described above can further include applying one or more 3D filters to the primary 3D grid. The one or more 3D filters can be applied to smooth out values in the primary 3D grid.

In some aspects, each layer of the primary 3D grid corresponds to a different range of luminance values. Moreover, in some examples, each layer of the primary 3D grid can include multiple cells populated with at least one color characteristic from the flash image and at least one color characteristic from the no-flash image, and a first cell from the multiple cells can include one or more color characteristics associated with a first respective set of pixel values from the flash image and one or more color characteristics associated with a second respective set of pixel values from the no-flash image. For example, each respective cell $c_i$ in the primary 3D grid can include a first respective set of pixel values associated with the flash image and a second respective set of pixel values associated with the no-flash image. The first set of pixel values can include pixel values from a first respective patch of pixels in the flash image and the second set of pixel values can include pixel values from a second respective patch of pixels in the no-flash image. In some cases, the first respective patch of pixels associated with the first set of pixel values can correspond to the second respective patch of pixels associated with the second set of pixel values. For example, the first and second respective patches of pixels can represent a same or matching patch of pixels in the flash and no-flash images.

Moreover, in some cases, the first respective patch of pixels in the flash image and the second respective patch of pixels in the no-flash image can be mapped to, or associated with, the same cell $c_i$ (e.g., the respective cell) in the primary 3D grid based on, for example, a location (e.g., x and y) and luminance associated with the first respective patch of pixels and a location (e.g., x and y) and luminance associated with the second respective patch of pixels. In some examples, the one or more color characteristics associated with the first respective set of pixel values from flash image can include at least a first pixel value average of the first respective set of pixel values, and the one or more color characteristics associated with the second respective set of pixel values from the no-flash image can include at least a second pixel value average of the second respective set of pixel values In some examples, the cell $c_i$ in the primary 3D grid can further include an indication of a number of pixels in at least one of the first respective patch of pixels and the second respective patch of pixels associated with that cell $c_i$. Also, in some cases, the first respective set of pixel values in the cell $c_i$ can include pixel value means or averages calculated for different color components (e.g., red (R), green (G), and blue (B) color components in the case of an RGB image) in the first respective patch of pixels, and the second respective set of pixel values can include additional pixel value means or averages calculated for the different color components (e.g., R, G, B) in the second respective patch of pixels.

In some aspects, the at least one method, apparatus, and a computer-readable medium described above can further include generating a second 3D grid for mapping the color information from the no-flash image to the flash image. The second 3D grid can include multiple cells, wherein each cell $c_i$ of the primary 3D grid corresponds to a different cell $c_k$ of the secondary 3D grid; calculating one or more weights or parameters for each pixel value mean or average in each respective cell $c_i$ of the primary 3D grid, wherein a weight or parameter ($\alpha$) of a first pixel mean or average associated with the cell $c_i$, when applied to the first pixel value mean or average associated with the cell $c_i$, adjusts a first color associated with the first pixel value mean or average within a threshold similarity to a second color associated with a second pixel value mean or average associated with the cell $c_i$ of the primary 3D grid, wherein the first pixel value mean or average and the second pixel value mean or average are associated with a same color component in the first respective patch of pixels and the second respective patch of pixels; and storing, in the second 3D grid, the one or more weights or parameters ($\alpha$). In some cases, the one or more weights or parameters ($\alpha$) can be stored in the different respective cell $c_k$ of the secondary 3D grid, which corresponds (the different respective cell) to the respective cell $c_i$ of the primary 3D grid.

In some cases, the primary 3D grid and the secondary 3D grid can include a same structure and/or number of layers and/or cells. Moreover, like the primary 3D grid, the secondary 3D grid can include two spatial dimensions (x, y), such as a horizontal dimension and a vertical dimension, and a luminance dimension (z). For example, the secondary 3D grid can include multiple layers of cells, with each layer corresponding to a different combination of horizontal, vertical and luminance states or values associated with the horizontal dimension, the vertical dimension, and the luminance dimension (x, y, z).

In some aspects, the first pixel value mean or average in the 3D grid can include one of the pixel value means or averages calculated for the different color components in the first respective patch of pixels of the flash image, and the second pixel value mean or average in the 3D grid can include one of the additional pixel value means or averages calculated for the different color components in the second respective patch of pixels of the no-flash image. In some aspects, the at least one method, apparatus, and a computer-readable medium described above can further include storing on the secondary 3D grid an indication of the number of pixels in at least one of the first respective patch of pixels and the second respective patch of pixels.

In some aspects, mapping color information from the no-flash image to the flash image and generating the output image can include identifying, for each of the pixels in the flash image, a corresponding cell $c_k$ in the secondary 3D grid; interpolating weights or parameters ($\alpha$) included in the corresponding cell $c_k$ and one or more neighboring cells; modifying, based on the weights or parameters interpolated, pixel values of the pixels in the flash image; and generating the output image based on the pixel values modified. In some examples, the weights or parameters ($\alpha$) can be interpolated based on a number of pixels associated with the corresponding cell $c_k$ in the secondary 3D grid and the one or more neighboring cells, and a distance associated with at least one of the corresponding cell $c_k$ and the one or more neighboring cells.

In some cases, mapping color information from the no-flash image to the flash image can include performing a localized tonal mapping algorithm using the primary 3D grid and the secondary 3D grid. For example, the weights or parameters (a) in the secondary 3D grid and the values in the cells of the primary 3D grid can be used in a tonal mapping algorithm to perform tonal mapping and/or transfer the color information from the no-flash image to the flash image.

In some aspects, the at least one apparatus described above can include a mobile device. In some cases, the at least one apparatus can include one or more image capturing devices, such as one or more cameras, for capturing the flash and no-flash images. In some cases, the apparatus can include a display for displaying one or more images, such as the output image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
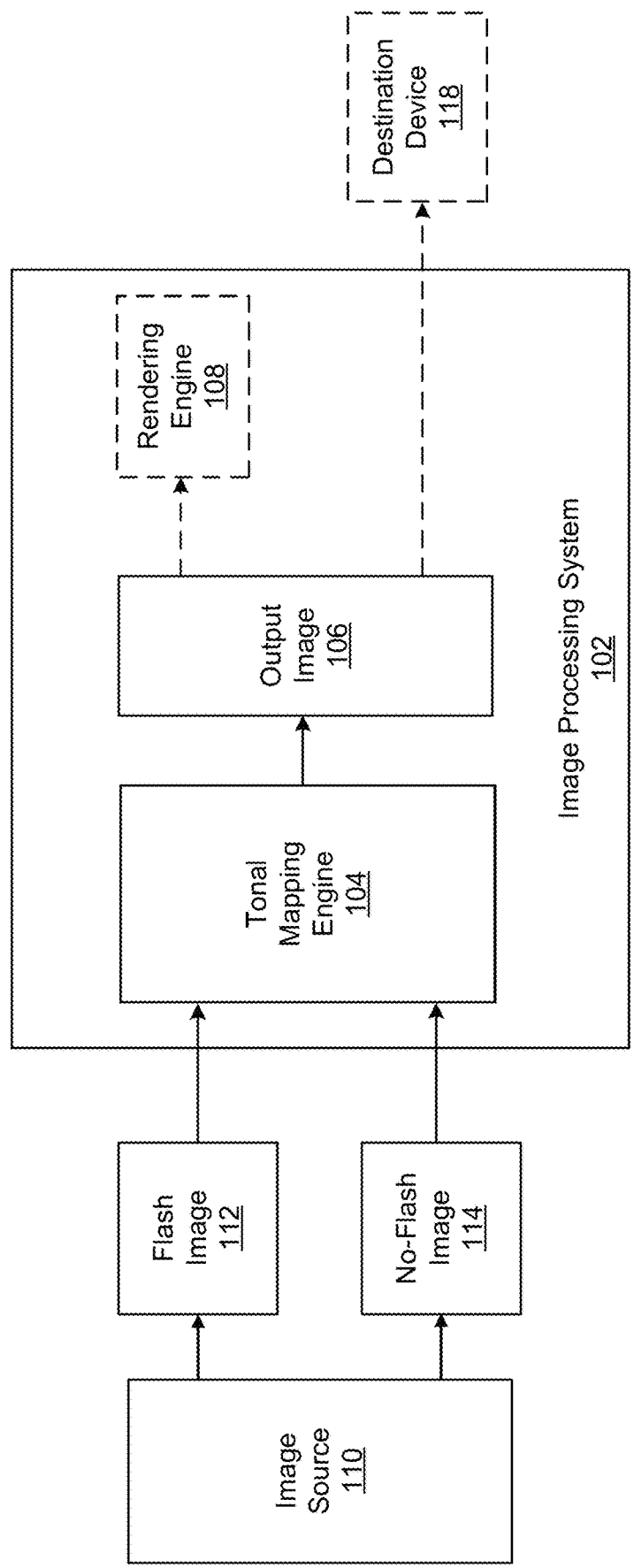
FIG. 1 illustrates an example of image processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Flash images are images produced using a flash of artificial light to help illuminate a scene being captured by the image. Flash images are typically used to illuminate a dark scene or provide a supplementary source of light when ambient light is inadequate. Flash images can help improve the quality of an image by providing additional lighting, but often suffer from incorrect or unnatural color which can be caused by a dominant bluish tint. On the other hand, no-flash images can often appear blurry and noisy, and are generally inadequate for dark or low-light environments.

Systems, methods, and computer-readable media are described herein for processing one or more images and tonal mapping color information between flash images and no-flash images to generate output images that have improved noise, brightness, texture and color characteristics as compared to the flash and no-flash images. The output can produce high-quality images suitable for dark, low-light, and other environments, which retain optimal color, texture and brightness. For instance, an image processing system can obtain a flash image of a scene and a no-flash image of the scene, and using the flash image as a baseline, the image processing system can transfer the color information from the no-flash image to the flash image to generate a composite output that maintains color, texture, and brightness. The image processing system can apply a localized tonal mapping algorithm to tone map color information between the flash image and the no-flash image, and transfer the color information from the no-flash image to the flash image. In some examples, the image processing system can use a primary data structure and a secondary data structure, such as a primary and secondary 3D grid or tensor, to perform the localized tonal mapping.

FIG. 1 is a diagram illustrating an example of an image processing system 102. The image processing system 102 can be implemented to process images as described herein. The image processing system 102 can include a tonal mapping engine 104 and a rendering engine 108, which in some cases can be optional (as denoted by the dashed outline in FIG. 1). For example, in some cases, the rendering engine 108 can be included in or used by the image processing system 102, and in other cases it can be omitted from or not used by the image processing system 102. Moreover, in some cases, the image processing system 102 can also include other components, such as, for example and without limitation, a filtering engine, a front-end processing engine, a machine learning engine, a denoising engine, etc.

The components of the image processing system 102 can include and/or can be implemented using electronic circuits or other electronic hardware, which can include, for example, one or more programmable electronic circuits (e.g., microprocessors, graphics processing units (GPUs), digital signal processors (DSPs), central processing units (CPUs), image signal processors (ISPs), and/or any other suitable electronic circuits), and/or can include and/or can be implemented using computer software, firmware, or any combination thereof, to perform the various operations described herein. While the image processing system 102 is shown to include certain components, one of ordinary skill will appreciate that the image processing system 102 can include more or fewer components than those shown in FIG. 1. For example, in some instances, the image processing system 102 can also include one or more memory components (e.g., one or more RAMs, ROMs, caches, buffers, and/or the like) and/or processing devices that are not shown in FIG. 1.

In some examples, the image processing techniques described herein can be performed after or in response to a flash image 112 and a no-flash image 114 being captured by an image sensor (e.g., a camera) or a computing device that includes an image sensor (e.g., a mobile device equipped with a camera), where the image processing can be automatically or manually selected for application to the captured images (112, 114). In some illustrative examples, the image processing can be invoked in response to selection of a flash setting, one or more graphical icons that cause flash and no-flash images to be processed to transfer color information from the no-flash image to the flash image, and/or other selection option(s) of the image processing system 102 and/or a device associated with the image processing system 102, such as a camera or computing device.

The image processing system 102 can receive as input flash image 112 and no-flash image 114 from an image source 110, and process the images to generate output image 106. The input images (112, 114) can include still images or individual video frames of a video sequence. Video frames can also be referred to herein as video pictures or pictures. Moreover, the flash image 112 and/or the no-flash image 114 can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

The image source 110 from which the images (112, 114) are received can include one or more image capturing devices and/or one or more video capturing devices (e.g., a digital camera, a digital video camera, a phone with a camera, a tablet with a camera, an image sensor, or any other suitable image data capturing device). Moreover, in some cases, the image source 110 can also include, for example, a data (e.g., image data, video data, etc.) storage device, an image and/or video archive for storing images, an image and/or video server or content provider providing image and/or video data, an image and/or video feed interface receiving images from a video server or content provider, a computer graphics system for generating computer graphics images and/or video data, a combination of such sources, or other source of image frame content. In some examples, multiple image sources can provide images to the image processing system 102. For instance, in some cases, the flash image 112 can be received from a different image source than the image source providing the no-flash image 114.

The image processing system 102 can be part of, or implemented by, one or more computing devices, such as one or more servers, one or more personal computers, one or more processors, one or more mobile devices (e.g., a smartphone, a camera, a smart television, a tablet computer, an internet-of-things device, etc.). In some cases, the one or more computing devices that include the image processing system 102 can one or more hardware components such as, for example, one or more wireless transceivers, one or more input devices, one or more output devices (e.g., a display), one or more sensors (e.g., an image sensor), one or more storage devices, one or more processing devices, etc. In some examples, a computing device that includes the image processing system 102 can be an electronic device, such as a phone (e.g., a smartphone, a video conferencing system, or the like), a camera (e.g., a digital camera, an IP camera, a video camera, a camera phone, a video phone, or other any suitable capture device), a desktop computer, a laptop or notebook computer, a tablet computer, a set-top box, a television, a display device, a digital media player, a video gaming console, a video streaming device, or any other suitable electronic device. In some implementations, the image processing system 102 and the image source 101 can be part of the same computing device. For example, in some cases, a phone, camera, tablet, and/or other device with an image source (e.g., a camera, storage, or the like) can include an integrated image processing system.

In some implementations, the image processing system 102 and the image source 110 can be part of separate computing devices. In one illustrative example, the image source 110 can be part of a camera system and the image processing system 102 can be part of a separate computing device, such as a mobile phone, a desktop computer, a laptop or notebook computer, a tablet computer, a server, a television, or any other computing device. In other implementations, the image processing system 102 and the image source 110 can be part of a same computing system(s). For example, the image processing system 102 and the image source 110 can be part of a same camera device, smartphone, tablet computer, desktop computer, server, television, or any other computing device.

In one example, the image processing system 102 can receive the no-flash image 114 and the flash image 112. The no-flash image 114 can be captured under low light conditions (and have low light characteristics) and the flash image 112 can be captured under higher light conditions (and have high light characteristics). The no-flash image 114 and the flash image 112 can be different images of a same scene, object, environment, etc. Due to the low light characteristics of the no-flash image 114, the no-flash image 114 can appear dark, blurry and/or noisy. On the other hand, the flash image 112 can have higher light characteristics as a result of an artificial light (e.g., a flash) used to illuminate the target (e.g., the scene, object, environment, etc.) captured by the flash image 112. However, the flash image 112 can often suffer from incorrect or unnatural color caused by a dominant bluish tint. Moreover, the flash image 112 can often do a better job at preserving the texture of the captured target while the no-flash image 114 may do a better job at preserving color information.

To improve the quality of the flash image 112, the image processing system 102 can receive the flash image 112 and the no-flash image 114, and transfer color information from the no-flash image 114 to the flash image 112, thereby improving the color of the flash image 112 while preserving the better texture and light characteristics of the flash image 112. The image processing system 102 can use the flash image 112 and the no-flash image 114 to generate a composite output (e.g., output image 106). For example, the image processing system 102 can use the flash image 112 as a baseline and transfer color information from the no-flash image 114 to the flash image 112 to generate a composite output that maintains color, texture, and brightness.

In one illustrative example, the tonal mapping engine 104 can perform color matching or tonal mapping between the flash image 112 and the no-flash image 114 and transfer color information from the no-flash image 114 to the flash image 112 based on the color matching. In some examples, the tonal mapping engine 104 can calculate a mean brightness of the no-flash image based on an average of the pixels in the no-flash image 114 and calculate a weighted average of the pixels in the flash image 112 that approximates a mean brightness of the flash image 112 to the mean brightness of the no-flash image 114. By approximating the mean brightness of the flash image 112 to the mean brightness of the no-flash image 114, the tonal mapping engine 104 can generate an output image 106, which can be a composite image that preserves color from the no-flash image 114 as well as other characteristics from the flash image 112, such as texture and light conditions. In some examples, the flash image 112 and the no-flash image 114 can be aligned and/or down-sampled before being color matched by the tonal mapping engine 104.

The tonal mapping engine 104 can perform the color matching or tonal mapping of the flash image 112 and the no-flash image 114 of a scene so that the color information from the no-flash image 114 can be mapped and transferred to the flash image 112, as previously explained. In some cases, a tonal mapping transform can be used by the tonal mapping engine 104 to map the color information from the no-flash image 114 to the flash image 112. The tonal mapping transform can use information from one or more data structures to perform the mapping. The data structures can include a tensor, a grid, a matrix, or other suitable data structure. The data structures can be populated with information associated with the flash and no-flash images.

In one illustrative example, a first three-dimensional (3D) grid can be generated, and each cell $c_i$ of the first 3D grid can include values associated with respective color components (e.g., red (R), green (G), and blue (B) for RGB images) of the pixels in each of the flash and no-flash images. In some cases, the values in a cell $c_i$ of the first 3D grid can include a mean or average of one or more color components of one or more pixels from the flash image, a mean or average of one or more color components of one or more corresponding pixels from the no-flash image, and a number of pixels associated with the mean or average values in the cell. Moreover, in some cases, a second 3D grid can be generated, and each cell $c_k$ in the second 3D grid can include weights or parameters for approximating a brightness of one or more pixels of the flash image to the brightness of one or more corresponding pixels of the no-flash image. Also, each cell $c_i$ in the first 3D grid can correspond to a specific cell $c_k$ in the second 3D grid, meaning that the cell $c_i$ in the first 3D grid and the specific cell $c_k$ in the second 3D grid represent, are associated with, and/or have values representing (or associated with) a same pixel or patch of pixels from the flash and no-flash images.

For example, a cell $c_i$ in the first 3D grid can include values associated with a patch of pixels from the flash image and values associated with another patch of pixels from the no-flash image, where the patch of pixels from the flash image and the patch of pixels from the no-flash image are estimated to represent a same patch of pixels (with the same pixel locations) found in both the flash and no-flash images. In addition, the specific cell $c_k$ in the second 3D grid corresponding to the cell $c_i$ in the first 3D grid can include values which are associated with the same patch of pixels from the flash and no-flash images. In other words, a patch of pixels in the flash image can be mapped to, or matched with, a patch of pixels in the no-flash image, and the mapped or matched patches of pixels from the flash and no-flash images can be used to generate and/or populate the values in a particular cell $c_i$ of the first 3D grid and another, corresponding cell $c_k$ of the second 3D grid.

In some cases, the image processing system 102 can apply a filter to a first data structure (e.g., the first 3D grid) before the color matching or tonal mapping is performed and/or a second data structure (e.g., the second 3D grid) generated. In some cases, when a first and second 3D grid is used, the image processing system 102 can apply a 3D filter to the first 3D grid. For example, the image processing system 102 can apply a 3D blur kernel to the first 3D grid to smooth out the values in the first 3D grid.

Using the information from the first and second data structures (e.g., the first and second 3D grids), the tonal mapping engine 104 can map the color information from the pixels of the no-flash image 114 to the pixels of the flash image 112. The tonal mapping engine 104 can map and transfer the color information using a tonal mapping transform as previously mentioned. Once the color matching or tonal mapping is performed, the image processing system 102 can output the output image 106, which can have improved brightness and color characteristics. In some cases, the image processing system 102 can provide the output image 106 to a destination device 118 for storage and/or rendering at the destination device 118. The destination device 118 can include, for example, a server, a storage device, a processing device, a laptop computer, a desktop computer, a smartphone, a camera, a television, a display, or any other suitable computing device. In some cases, the destination device 118 can be separate from the image processing system 102. In other cases, the destination device 118 can be part of, or implemented by, the image processing system 102.

In some examples, the image processing system 102 can provide the output image 106 to a rendering engine 108 for rendering. For example, the image processing system 102 can provide the output image 106 to the rendering engine 108 either in addition to, or in lieu of, providing the output image 106 to the destination device 118. The rendering engine 108 can be configured to then render the output image 106 for display.

Figure 2:
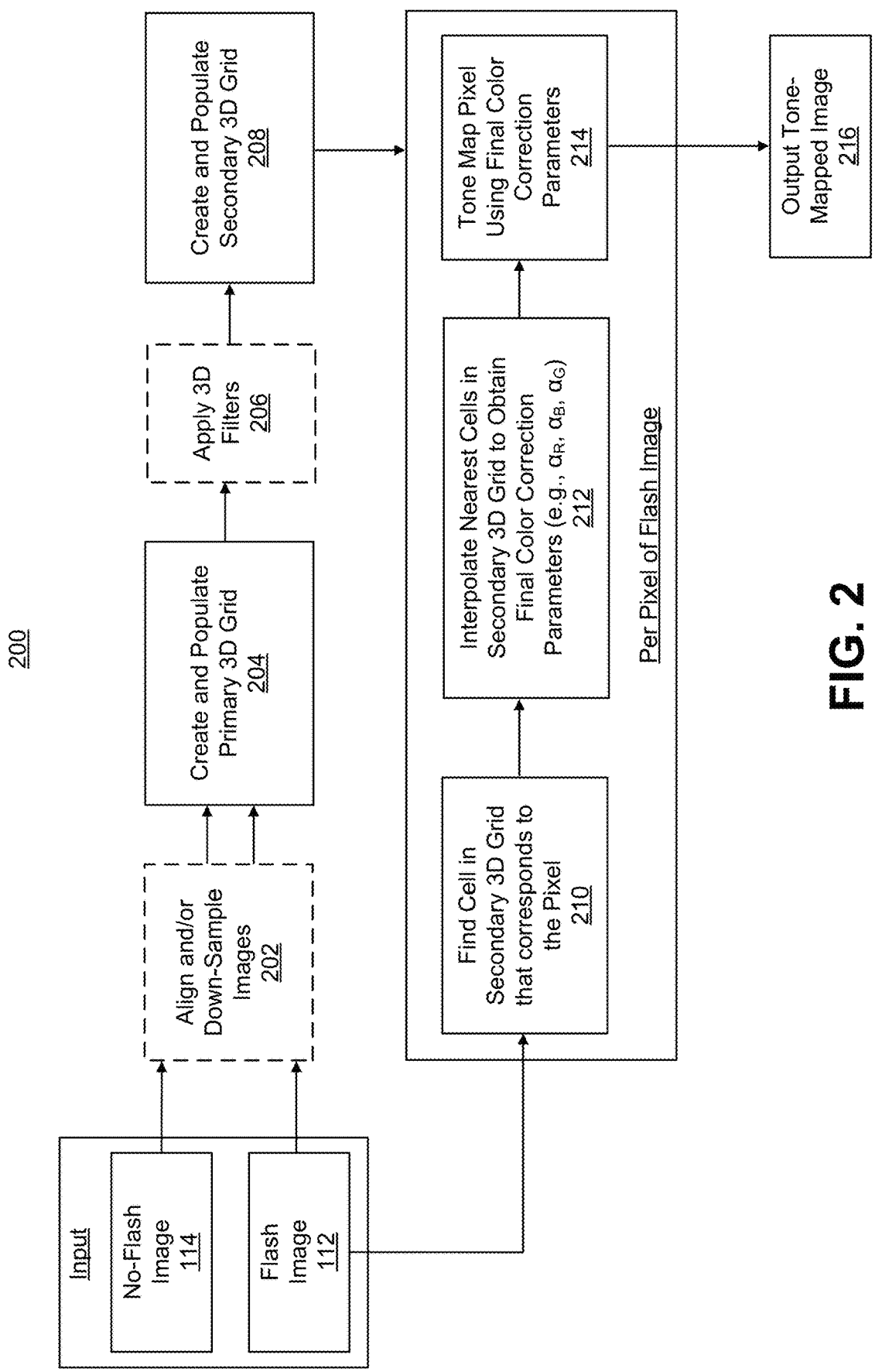
FIG. 2 illustrates a flowchart of an example of process for performing tonal mapping between a flash image and a no-flash image, in accordance with some examples.

FIG. 2 illustrates an example process 200 performing tonal mapping (e.g., color and/or brightness matching) between flash image 112 and no-flash image 114. The tonal mapping algorithm is an edge-aware algorithm that locally maps or matches information associated with the color components (e.g., R, G, B) of two input images, such as the flash image 112 and no-flash image 114. The tonal mapping algorithm can adjust the color and/or brightness of the flash image 112 based on color information ascertained from the no-flash image 114 and transferred to the flash image 112.

Figure 4:
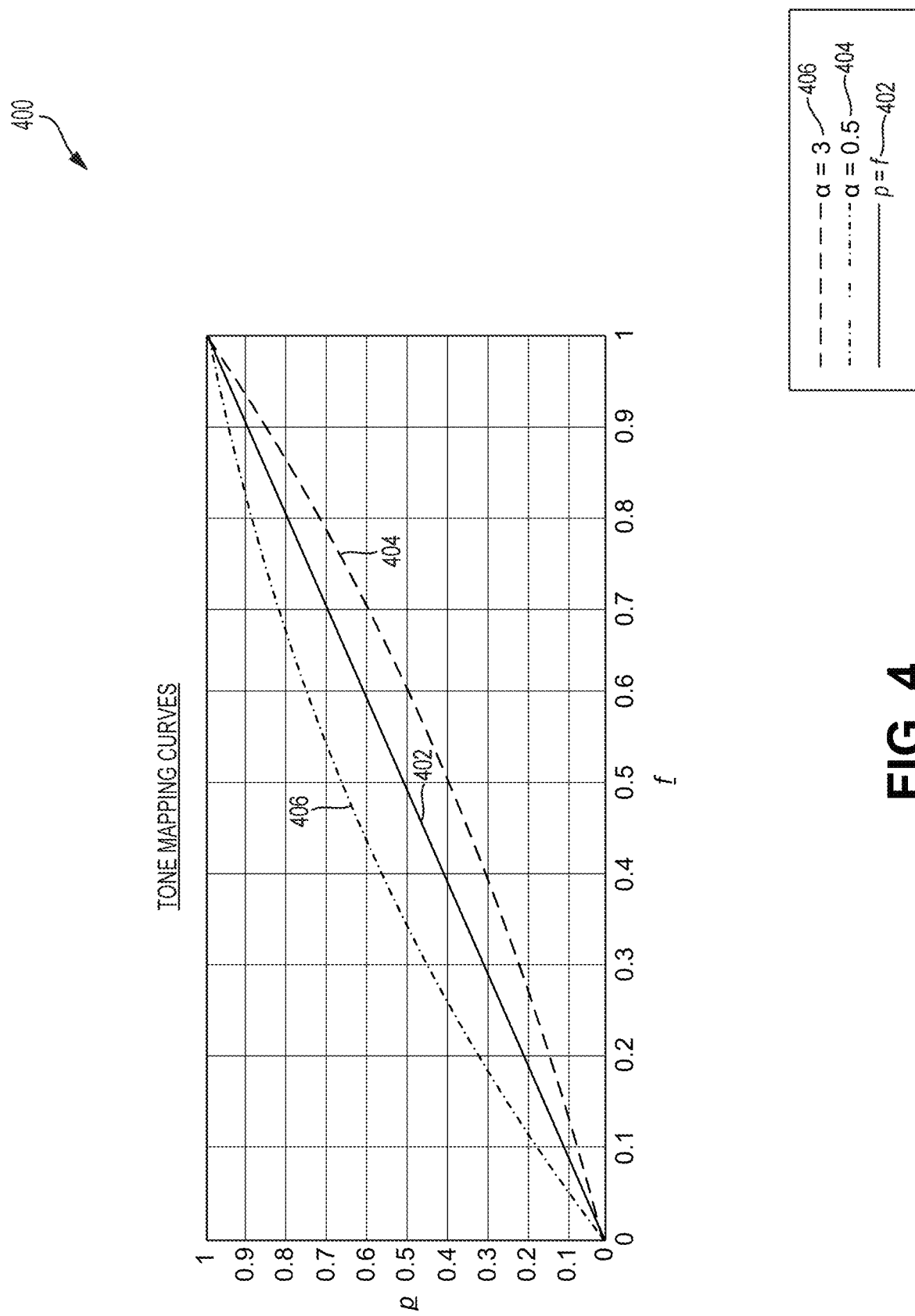
FIG. 4 illustrates a chart of example tone mapping curves generated based on different brightness adjustment parameter values, in accordance with some examples.

The tonal mapping algorithm can work by providing a brightness or color map to be applied to the flash image 112. The brightness or color map can be described by the following equation:

$$p = \frac{\log((\alpha - 1)f + 1)}{\log(\alpha)}, \alpha > 0, \alpha \neq 1 \quad \text{Equation (1)}$$

where f represents the pixel values of the flash image 112, p represents the tone-mapped pixel values of the flash image 112, and $\alpha$ represents a parameter for altering the brightness level of f. In Equation 1 illustrated above, $\alpha>1$ values lead to the brightening of f, while $\alpha<1$ lead to the darkening of f. These two example scenarios are depicted in FIG. 4, which is further described below, where the brightness map curves are shown for $\alpha=0.5$ and $\alpha=3.0$.

The optimal value of $\alpha$ ($\alpha_{opt}$) can be a value that makes the brightness and/or color of p equal to the brightness and/or color of the no-flash image 114 (denoted by g hereinafter), or that best approximates the brightness and/or color of p to the brightness and/or color of the no-flash image 114. In some cases, to find the optimal value of $\alpha$ ($\alpha_{opt}$), an iterative tonal mapping algorithm can be implemented. In one illustrative example, at step 1 the iterative tonal mapping algorithm calculates the mean of the color components (e.g., R, G, B) of g (the mean of the no-flash image 114), denoted by $\mu_g$ hereinafter, and initializes $\alpha$ (e.g., based on a random or other value). At step 2, the iterative tonal mapping algorithm tone maps the pixels of f based on Equation 1 to get p. At step 3, the iterative tonal mapping algorithm calculates the mean of the color components (e.g., R, G, B) of p ($\mu_p$). At step 4, the iterative tonal mapping algorithm compares the values of $\mu_g$ and $\mu_p$. If $\mu_g$ equals $\mu_p$, the algorithm stops and the value of $\alpha$ is determined to be the optimal value ($\alpha_{opt}$). Otherwise, the algorithm updates the value of $\alpha$ and returns to step 2.

In some examples, to increase the speed and efficiency of the tonal mapping algorithm, a relaxed stop condition can be implemented using equation (2) below. For example, an optimal $\alpha$ ($\alpha_{opt}$) can be determined as follows:

$$\alpha_{opt}: \mu_g = \mu_p = \frac{1}{N_f} \sum \frac{\log((\alpha_{opt} - 1)f_i + 1)}{\log(\alpha_{opt})} \quad \text{Equation (2)}$$

$$\approx \frac{\log\left((\alpha_{opt} - 1)\frac{1}{N_f}\sum f_i + 1\right)}{\log(\alpha_{opt})}$$

$$= \frac{\log((\alpha_{opt} - 1)\mu_f + 1)}{\log(\alpha_{opt})}$$

where $\mu_f$ is the mean of the flash image 112. In this example, in each iteration, the tonal mapping algorithm does not need to tone map the entire flash image 112 to find the optimal value for $\alpha$. Instead, the tonal mapping algorithm can implement Equation 2 to apply tone mapping to the mean of the flash image 112. This example implementation (based on Equation 2) of the tonal mapping algorithm can be as efficient as tone mapping a single pixel rather than the entire image, which can make the algorithm significantly faster than tone mapping the entire flash image 112.

In addition, the tone mapping algorithm can be localized for increased quality and/or efficiency. The tonal mapping algorithm can be localized not only in a spatial domain or dimension (e.g., x and y), but also in a luminance domain or dimension corresponding to luminance intensity (e.g., z). The localization can be done using primary and secondary data structures. A primary and secondary three-dimensional (3D) grid (e.g., a tensor or bilateral grid), as described below with respect to blocks 204 and 208, will be used herein as example primary and secondary data structures. The tonal mapping applied in a 3D localized manner can be edge-aware and can deliver sharp results with true or improved colors.

For example, as shown in process 200, the flash image 112 and no-flash image 114 can first be aligned and/or down-sampled at block 202. The alignment and down-sampling are optional, as indicated by the dashed outline of block 202. The alignment does not have to be very accurate as the algorithm is robust against slight misalignments. Moreover, the down-sampling can be performed in order to lower the number of calculations that are needed to populate the 3D grids described below with reference to blocks 204 and 208. For example, if the flash image 112 and no-flash image 114 are down-sampled by a factor of 10 in each direction, the number of pixels that are needed to calculate the mean or average pixel values for the color components, which are used to populate a grid cell is reduced by a factor of 100. The two images do not have to have the same resolution. Also the amount of information stored in the grid is independent of the image size.

At block 204, the tonal mapping engine 104 can create and populate a primary 3D grid (e.g., 3D tensor). The primary 3D grid can include multiple cells in three dimensions. The three dimensions can include two spatial (x, y) dimensions (e.g., a horizontal and a vertical direction) of the flash image 112 and the no-flash image 114, and a third dimension (z) for luminance. For instance, each layer in the third dimension of the primary 3D grid can correspond to a range of luminance intensity values of the pixels from the images (112, 114). In one illustrative example, the pixels in the flash image 112 and the no-flash image 114 can have luminance values ranging from 0-255, and there can be five ranges of luminance intensity values corresponding to five layers in the primary 3D grid. In this example, the ranges of luminance intensity values can include a first range of 0-50, a second range of 51-101, a third range of 102-152, a fourth range of 153-203, and a fifth range of 204-255. One of ordinary skill will appreciate that any numbers of ranges can be used.

Each cell $c_i$ of the primary 3D grid can include pixel values associated with the color components (e.g., red (R), green (G), and blue (B) for RGB images) of a patch of pixels from the flash image 112 and the no-flash image 114. The patch of pixels can include those pixels in the flash image 112 and the no-flash image 114 determined to correspond to that cell $c_i$. Moreover, a patch of pixels can include any number of pixels such as, for example, a 20×20 patch of pixels located at x and y positions (0, 0) through (20, 20) in the flash image 112 and the no-flash image 114. In some cases, the pixel values in a cell can include mean or average values calculated for the color components of those pixels corresponding to the cell $c_i$.

Moreover, the individual cells in the primary 3D grid can be populated by information extracted from f and g. Once the primary 3D is fully populated, local tone mapping can be applied to f using the information available in the primary 3D grid, as further described below. Also, when creating the primary 3D grid, the numbers of cells in the x, y, z directions (e.g., the horizontal, vertical, and luminance dimensions) can be optional. In some examples, each cell $c_i$ in the primary 3D grid can be populated by 7 numbers including a mean or average value of the color components (e.g., R, G, and B) of those pixels of f and g that correspond to that cell $c_i$ as well as the number of those pixels.

For example, each cell $c_i$ in the primary 3D grid can correspond to specific values or range(s) of values in the x, y, and z directions (e.g., the location and depth along the horizontal, vertical, and luminance dimensions or directions of the primary 3D grid). The tonal mapping engine 104 can use the x, y, and z values of the cell $c_i$ to determine which pixels of the flash image 112 and the no-flash image 114 match or correspond to that cell $c_i$. In some examples, the tonal mapping engine 104 can identify a patch of pixels in the flash image 112 and the no-flash image 114 that match or correspond to that cell $c_i$ by matching or comparing the x, y, and z values of that cell $c_i$ to the location (e.g., the horizontal and vertical (x and y) location) and luminance of the pixels in the flash image 112 and the no-flash image 114. To illustrate, if the x and y directions of the cell $c_i$ correspond to a bottom, left corner location, the tonal mapping engine 104 can check the pixels in bottom, left corner of the flash image 112 and the no-flash image 114 to find those pixels in the flash image 112 and the no-flash image 114 that match or correspond to that cell $c_i$.

Once the pixels in the flash image 112 and the no-flash image 114 corresponding to that cell $c_i$ are identified, the tonal mapping engine 104 can calculate the averages of those pixels for both the flash image 112 and the no-flash image 114. The averages of the pixels can include the average of each color component (e.g., the average of the R channel, the average of the G channel, and the average of the B channel) in those pixels. For example, the averages of the pixels can include the average of the R channel (e.g., the red from the RGB channels) of the corresponding pixels in the flash image 112 and the average for the R channel in the corresponding pixels of the no-flash image 114, the average of the G channel (e.g., the green from the RGB channels) of the corresponding pixels in the flash image 112 and the average for the G channel in the corresponding pixels of the no-flash image 114, and the average of the B channel (e.g., the blue from the RGB channels) of the corresponding pixels in the flash image 112 and the average for the B channel in the corresponding pixels of the no-flash image 114.

Thus, in this example, the total amount of values calculated for those pixels includes 6 values: the average RGB values for the corresponding pixels in the flash image 112 and the average RGB values for the corresponding pixels in the no-flash image 114. After calculating the various values for the cell $c_i$, the tonal mapping engine 104 can then populate the cell $c_i$ with those values (e.g., the averages of the pixels) calculated for the corresponding pixels as well as a value representing the number of pixels associated with that cell $c_i$, and continue to the next cell $c_{i+1}$ in the primary 3D grid, where the tonal mapping engine 104 similarly finds the pixels in the flash image 112 and the no-flash image 114 corresponding to that cell $c_{i+1}$ and populates the cell $c_{i+1}$ with the averages calculated for those pixels as well as a value representing the number of pixels associated with that cell $c_{i+1}$.

At block 206, once the entire primary 3D grid has been populated, the tonal mapping engine 104 can apply a 3D filter to the primary 3D grid. The 3D filter can be applied to smooth out the values in the primary 3D grid. For example, the tonal mapping engine 104 can apply a 3D blur kernel to the primary 3D grid in order to smooth out the values in the primary 3D grid.

At block 208, the tonal mapping engine 104 can then create and populate a secondary 3D grid. The secondary 3D grid can be the same size as the primary 3D grid. For example, the secondary 3D grid can include the same number of cells and layers of cells as the primary 3D grid. Moreover, each cell $c_k$ in the secondary 3D grid can be populated with a respective optimal α value ($α_{opt}$) for each color component in the pixels associated with that cell $c_k$. For example, in some cases, each cell $c_k$ in the secondary 3D grid is populated with 4 numbers, including three α values for the R, G, and B channels in the pixels associated with that cell $c_k$, as well the number of pixels (e.g., as previously described with respect to the primary 3D grid).

The optimal α values ($α_{opt}$) can be calculated using the mean RGB values stored in the corresponding cell $c_i$ of the primary 3D grid (e.g., the cell in the primary 3D grid having the same or matching values along the x, y, and z dimensions), and applying the tonal mapping algorithm and relaxed stop condition (e.g., Equation 2) to obtain the optimal α value ($α_{opt}$) for R, G, and B. For example, in some cases, the $α_R$ value (e.g., the α value of R) for a cell $c_k$ can be calculated using the local means of the R channels of the flash image 112 and the no-flash image 114 stored in the corresponding cell $c_i$ of the primary 3D grid, the $α_G$ value (e.g., the α value of G) for a cell $c_k$ can be calculated using the local means of the G channels of the flash image 112 and the no-flash image 114 stored in the corresponding cell $c_i$ of the primary 3D grid, and the $α_B$ value (e.g., the α value of B) for a cell $c_k$ can be calculated using the local means of the B channels of the flash image 112 and the no-flash image 114 stored in the corresponding cell $c_i$ of the primary 3D grid.

Once the secondary 3D grid is populated with the optimal α values ($α_{opt}$) for each color component (e.g., R, G, B) per cell, the tonal mapping engine 104 can apply tonal mapping locally to the flash image 112. First, at block 210, the tonal mapping engine 104 can find, for each pixel of the flash image 112, the cell $c_k$ in the secondary 3D grid that corresponds to that pixel (e.g., the cell where the pixel falls into). The tonal mapping engine 104 can find the corresponding cell $c_k$ for a pixel by, for example, comparing or matching the x, y, z values associated with that cell $c_k$ with the location and/or luminance of the pixel, as previously mentioned.

At block 212, the tonal mapping engine 104 can then interpolate, for each pixel of the flash image 112, the α values (e.g., $\alpha_R$, $\alpha_G$, and $\alpha_B$) in the pixel's corresponding cell $c_k$ of the secondary 3D grid and the α values in one or more neighboring cells of the secondary 3D grid to obtain final color correction or brightness adjustment parameters. The outputs of the interpolation (e.g., the final color correction or brightness adjustment parameters) can be optimized $\alpha_R$, $\alpha_G$, and $\alpha_B$ values, for example. Moreover, in some cases, the tonal mapping engine 104 can interpolate the α values in the cell $c_k$ and the one or more neighboring cells using the distance and number of pixels in each cell.

For example, the tonal mapping engine 104 can interpolate the nearest cells in the secondary 3D grid to obtain the α values that will be used for tonal mapping. To illustrate, the tonal mapping engine 104 can interpolate the α values based on the distance of the pixel p from the center of every cell, including the pixel's corresponding cell $c_k$ of the secondary 3D grid and one or more of the nearest neighboring cells in the secondary 3D grid. In one illustrative example, if the cells are 21×21 pixels in the x and y directions, then a pixel at location (11, 11) in a cell c0 is the center pixel p. For tonal mapping a pixel at location (15, 20), the distance to the center in the x direction is 4 (15 minus 11) and the distance to the center in the y direction is 9 (20 minus 11). For the x direction, because 15>11, the cell after cell c0 in the x direction can be considered as the nearest neighbor. For the y direction, because 20>11, the cell after cell c0 in the y direction can be considered as the nearest neighbor. The same can apply to the z direction (luminance). In some cases, the interpolated α values can then be determined as the weighted average of the values in the cell c0 and the values in the nearest neighbor cells. The weights used for the weighted average can be inversely proportional to the distances, in which case a higher weight can be used for values in the cells that have a center with a shorter distance to the pixel for which tonal mapping is being performed.

At block 214, the tonal mapping engine 104 can tone map each pixel in the flash image 112 using the final color correction or brightness adjustment parameters generated from the interpolation in block 212. In some examples, the tonal mapping engine 104 can tone map each pixel in the flash image 112 using a tonal mapping equation, such as Equation 1 or Equation 2 described above. For example, the tonal mapping engine 104 can tone map each pixel in the flash image 112 using Equation 1 or Equation 2 shown below, to calculate p representing the tone-mapped pixel values:

$$p = \frac{\log((\alpha - 1)f + 1)}{\log(\alpha)} \quad \text{Equation (1)}$$

$$p = \frac{\log((\alpha_{opt} - 1)\mu_f + 1)}{\log(\alpha_{opt})} \quad \text{Equation (2)}$$

where α denotes the final color correction or brightness adjustment parameters generated from the interpolation in block 212 and f denotes the pixel values in the primary 3D grid (e.g., the pixel values of the flash image 112).

At block 216, the tonal mapping engine 104 can output a tone-mapped image generated based on the tonal mapping at block 214. The tone-mapped image can be the flash image 112 modified based on the tonal mapping to include the color information (e.g., brightness levels and/or color values) from the no-flash image 114. The output tone-mapped image can thus preserve the color information from the no-flash image 114 while maintaining the texture and high-light conditions of the flash image 112.

Figure 3A:
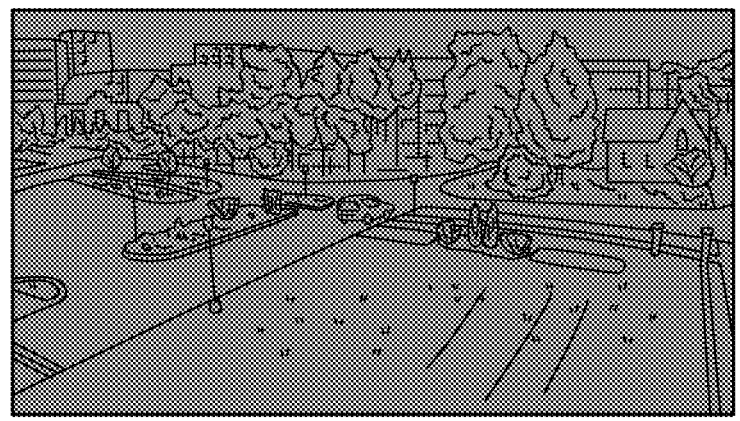
FIG. 3A illustrates an example of a no-flash image of a scene, in accordance with some examples.
Figure 3A:
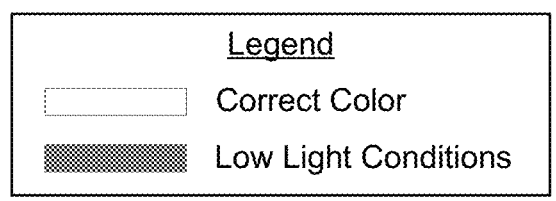
Figure 3B:
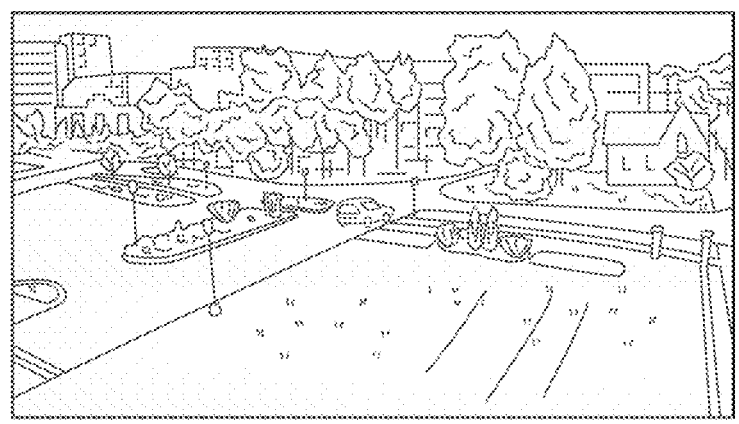
FIG. 3B illustrates an example of a flash image of a scene, in accordance with some examples.
Figure 3C:
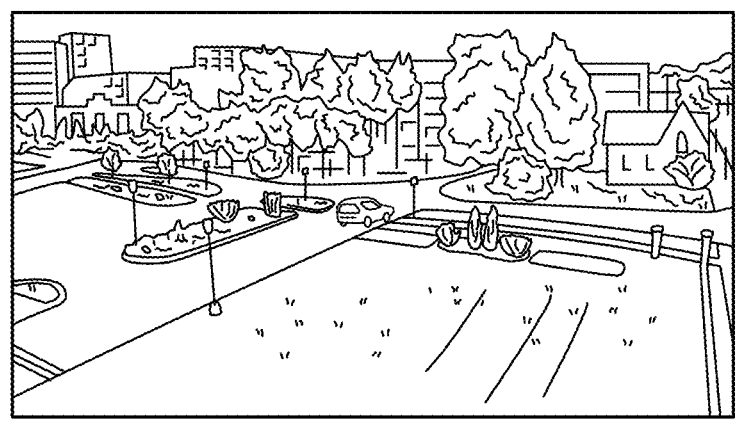
FIG. 3C illustrates an example of a tone-mapped image of a scene, in accordance with some examples.

FIGS. 3A and 3B show an example photograph 300 illustrating a no-flash image and an example photograph 310 illustrating a flash image. By comparison, FIG. 3C shows an example photograph 320 illustrating a tone-mapped image (e.g., the output tone-mapped image from process 200 shown in FIG. 2) based on the no-flash image and the flash image illustrated in photographs 300 and 310. As can be seen by the no-flash image illustrated by the photograph 300 in FIG. 3A, no-flash images can appear dark while maintaining correct color information. The no-flash images can appear dark due to low light conditions, such as a low or inadequate ambient light.

By contrast, as seen by the flash image illustrated by the photograph 310 in FIG. 3B, flash images can brighten or illuminate a scene or environment that would otherwise appear dark. Flash images can use artificial light to illuminate a scene or environment being captured in order to improve the light conditions of the scene or environment and thereby increase the brightness or light in the captured image. Flash images can also maintain the texture of the scene or environment. However, flash images can have an incorrect or unnatural color due to a dominant bluish tint produced by the artificial light (e.g., the flash) used to generate the flash images. Thus, as illustrated by photographs 300 and 310, flash images can preserve an image texture but convey inaccurate color information, while no-flash images can preserve more accurate color information but may appear dark, noisy, and/or blurry.

By contrast, as shown by the tone-mapped image illustrated by the photograph 320, tone-mapped images generated as described herein can preserve the texture and light captured by flash images while maintaining the correct (or natural) color information from the no-flash images. Thus, the tone-mapped images can have better quality than no-flash images and flash images that are not tone mapped by combining various respective advantages of the flash and no-flash images (e.g., color, texture, brightness, etc.) while eliminating or reducing the respective disadvantages of the flash and no-flash images (e.g., incorrect or unnatural color information, poor lighting, lack of texture, etc.).

The tone-mapped image illustrated by the photograph 320 can be produced by transferring color information from the no-flash image in photograph 300 to the flash image in photograph 310 using a tonal mapping technique as described herein. For example, the no-flash and flash images illustrated by photographs 300 and 310 can be used as input images in the process 200 shown in FIG. 2. The tonal mapping engine 104 can process the input images as previously described to generate the tone-mapped image illustrated by the photograph 320.

FIG. 4 is a chart 200 illustrating different tone-mapping curves produced by tone mapping an image using different brightness or color altering parameters (e.g., α). As previously mentioned, the α values can be used in a tone mapping algorithm as described herein to alter the brightness or color information of an image. Thus, different α values can produce different brightness or color results or alterations. In this example, the line 402 plots the brightness levels of the pixels of an image when p, which denotes the tone-mapped pixel values of the image, is equal to f, which denotes the pixel values of the image. In other words, the line 402 plots the baseline brightness of the pixel values of the image without any brightness alterations. On the other hand, line 404 represents the tone-mapping curve produced when α equals 0.5, and line 406 represents the tone-mapping curve produced when α equals 3.

As seen by the tone-mapping curves of lines 404 and 406, when α is greater than 1, the tone-mapping curve (406) falls above the p=f line (402), resulting in increased brightness levels (e.g., brightening), and when α is less than 1, the corresponding tone-mapping curve (404) falls above the p=f line (410), resulting in decreased brightness levels (e.g., darkening). Accordingly, by adjusting the value of α, the tone mapping engine 104 can alter the brightness levels of the pixels values of the image. Therefore, the tone mapping engine 104 can adjust the value of α in the iterative tone-mapping algorithm previously described, until an optimal value of α is identified. The optimal value of α can be considered to be one that makes the brightness of the output image equal to, or significantly similar to, the brightness of the no-flash image used as one of the inputs of the tone mapping algorithm. The optimal value of α can then be used to generate an optimal image output as previously explained.

FIG. 5 illustrates an example of a primary 3D grid 500 populated with pixel values of flash image 112 (denoted as FI) and pixel values of no-flash image 114 (denoted as NFI), which can be used by the tone mapping engine 104 to generate an output image as described with respect to process 200 shown in FIG. 2. For illustrative purposes, an example of the primary 3D grid 500 will be described herein where the 3D grid represents the primary 3D grid generated in block 204 of process 200, and each pixel value in a cell $c_i$ represents the mean or average of a color component (e.g., R, G, B of an RGB image) in a patch of pixels corresponding to that cell $c_i$. However, one of ordinary skill in the art will recognize that the structure of the primary 3D grid 500 and the various principles described in the following example may also apply to the secondary 3D grid generated in block 208 of process 200.

In one illustrative example, the flash image 112 and the no-flash image 114 can each have a resolution of 160 pixels×100 pixels. For example, the two images can be captured with a same resolution. In another example, one or both of the s flash image 112 and the no-flash image 114 can be down-sampled (e.g., at block 202 of process 200) or up-sampled so that the two images have a same resolution. In such an example, the primary 3D grid 500 can include a grid of 8×5 cells in the x and y dimensions, as shown in FIG. 5. Each cell $c_i$ in the primary 3D grid 500 can include pixel values corresponding to different color components of a patch of 20 pixels×20 pixels from the flash image 112, and pixel values corresponding to different color components of a patch of 20 pixels×20 pixels from the no-flash image 114. One of ordinary skill in the art will appreciate that the images can have any suitable resolution, such as 1280×720 pixels, 1920×1080 pixels, 3840×2160 pixels, or any other suitable resolution. The number of cells of a 3D grid, and/or the number of pixels each cell represents, can change based on the resolution of the input images.

In some cases, the flash image 112 and the no-flash image 114 do not need to have a same resolution when populating the grid. In such cases, additional processing may be needed to map the corresponding patches of the flash image 112 and the no-flash image 114. For instance, using a flash image having a resolution of 100×200 and a no-flash image having a resolution of 200×400 as an illustrative example, if a cell in the 3D grid corresponds to a 10×10 patch of pixels in the flash image, the 10×10 patch would correspond to a 20×20 patch in the no-flash image.

The primary 3D grid 500 in this example has a depth of 5 layers, resulting in the primary 3D grid 500 having a dimension of 8×5×5. Each layer in the primary 3D grid 500 corresponds to a range of luminance values. In one illustrative example, the pixels in the input images (112, 114) can have luminance values ranging from 0-255, and there can be five ranges of luminance values (corresponding to the five layers in the primary 3D grid 500). In such an example, the ranges of luminance values can include a first range of 0-50, a second range of 51-101, a third range of 102-152, a fourth range of 153-203, and a fifth range of 204-255. In another example, instead of five ranges, ten ranges can be used, in which case the luminance ranges can include 0-24, 25-50, 51-75, 76-101, 102-126, 127-152, 153-177, 178-203, 204-229, and 230-255. One of ordinary skill in the art will appreciate that any numbers of ranges can be used.

The flash image 112 and the no-flash image 114 can include any suitable type of image, such as an RGB image, a YCbCr images, or other type of image. For YCbCr images (as well as other color spaces with a luminance (e.g., Y) component), the Y component indicates the luminance of the pixel, in which case the luminance does not need to be computed. The term luminance can refer to relative luminance or luma. The luminance of the pixels of an RGB image can be determined using any suitable technique. In one illustrative example, luminance of an RGB pixel can be calculated as the weighted sum of the color components of the RGB pixel. For instance, luminance can be determined by performing the following calculation:

$$Y = aR + bG + cB \qquad \text{Equation (3)}$$

where R represents the red component of a pixel (e.g., a value between 0-255), G represents the green component of the pixel (e.g., a value between 0-255), and B represents the blue component of the pixel (e.g., a value between 0-255).

The R, G, and B components can be gamma-compressed components (e.g., R', G', B' to determine luma, where the prime symbol denotes gamma compression), or can be linear components (R, G, B to determine relative luminance). The a, b, and c parameters are weights that, when added together, result in a normalization value equal to 1, 100, or any other suitable normalization value. The a, b, and c parameters can be set to any suitable value. For example, the value of each of a, b, and c can be set based on the relative contribution of each color component to the intensity perceived by humans. In one illustrative example, a can be set to a value of 0.2126, b can be set to a value of 0.7152, and c can be set to a value of 0.0722, indicating that the green color contributes most to the intensity perceived by humans, and the blue color contributes the least. Any other suitable values can be used for a, b, and c.

In the above illustrative example, the flash image 112 and the no-flash image 114 each has a resolution of 160 pixels× 100 pixels, resulting in each cell of the primary 3D grid 500 representing a patch of 20×20 pixels. Using this example, each cell in the primary 3D grid 500 can include a mean or average of each color component in a respective patch of 20 pixels×20 pixels from the flash image 112 and the no-flash image 114. For instance, per pixel patch and per color channel (e.g., per each of the R, G, and B color channels), a mean or average of the patch of the flash image 112 and a mean or average of the patch of the no-flash image 114 can be stored in every grid cell. In addition, each cell can store a value indicating the number of pixels represented by the cell.

The mean or average for a patch of pixels per color component can be computed by adding together each of the pixel values for that color component in the patch, and dividing the total by the number of pixels in the patch. Using a size of 20×20 for the pixel patches as an example, the values of the 400 pixels in a 20×20 patch can be added together, and the result can be divided by 400 to obtain the mean or average value for the 20×20 patch.

In some cases, each cell can be referenced by a location (x, y, z), where x indicates the row in the primary 3D grid 500, y indicates the column in the primary 3D grid 500, and z indicates the layer (or depth) in the primary 3D grid 500. In one illustrative example, a top-left cell 502 in a first layer of the primary 3D grid 500 can be referenced as being at location (0, 0, 0) of the primary 3D grid 500. The cell 502 can include the means or averages for each color component of a patch of pixels from the flash image 112, and the means or averages for each color component of a patch of pixels from the no-flash image 114. In an illustrative example, the patch of pixels can include a top-left most patch of 20×20 pixels from each of the flash image 112 and the no-flash image 114. In some cases, only those pixels from the patch of pixels that have luminance values within a certain range of luminance values are considered when calculating the values that are to be included in the cell 502 at location (0, 0, 0). Using the above illustrative example where five ranges of luminance values are used, the range of luminance values can be between 0-50, in which case only those pixels from the patch of pixels having a luminance value between 0-50 will be considered when determining the means or averages for the cell 502.

For example, the cell 502 can include a mean or average (denoted as $m_{FI(R)(0,0,0)}$) of the red (R) component values of the pixels from the top-left most 20×20 pixel patch in the flash image 112 that have luminance values between 0-50, a mean or average (denoted as $m_{FI(G)(0,0,0)}$) of the green (G) component values of the pixels from the top-left most 20×20 patch in the flash image 112 that have luminance values between 0-50, and a mean or average (denoted as $m_{FI(B)(0,0,0)}$) of the blue (B) component values of the pixels from the top-left most 20×20 patch in the flash image 112 that have luminance values between 0-50. The cell 502 can also include a mean or average (denoted as $m_{NFI(R)(0,0,0)}$) of the red (R) component values of the pixels from the top-left most 20×20 pixel patch in the no-flash image 114 that have luminance values between 0-50, a mean or average (denoted as $m_{NFI(G)(0,0,0)}$) of the green (G) component values of the pixels from the top-left most 20×20 patch in the no-flash image 114 that have luminance values between 0-50, and a mean or average (denoted as $m_{NFI(B)(0,0,0)}$) of the blue (B) component values of the pixels from the top-left most 20×20 patch in the no-flash image 114 that have luminance values between 0-50. In addition, the cell 502 can include a value indicating the number of pixels represented by the cell 502.

A top-left cell at location (0, 0, 1) in a second layer of the primary 3D grid 500 can include a mean or average for each color component of the top-left most 20×20 pixel patch from the flash image 112 that have luminance values between 51-101, and a mean or average for each color component of the top-left most 20×20 pixel patch from the no-flash image 114 that have luminance values between 51-101. The remaining cells of the primary 3D grid 500 can be populated with means or averages of other pixel patches of the flash image 112 and the no-flash image 114 in a similar manner.

In some examples, a filter can be applied to the primary 3D grid 500 before the tone mapping is performed. In one example, a 3D filter can be applied to the primary 3D grid 500 at block 206 of process 200, as previously described. The filtering is optional, as indicated by the dotted outline of block 206. The 3D filters can include low pass filters that are used to smooth out the numbers in the 3D grid, which can prevent sharp transitions between cells.

Figure 5A:
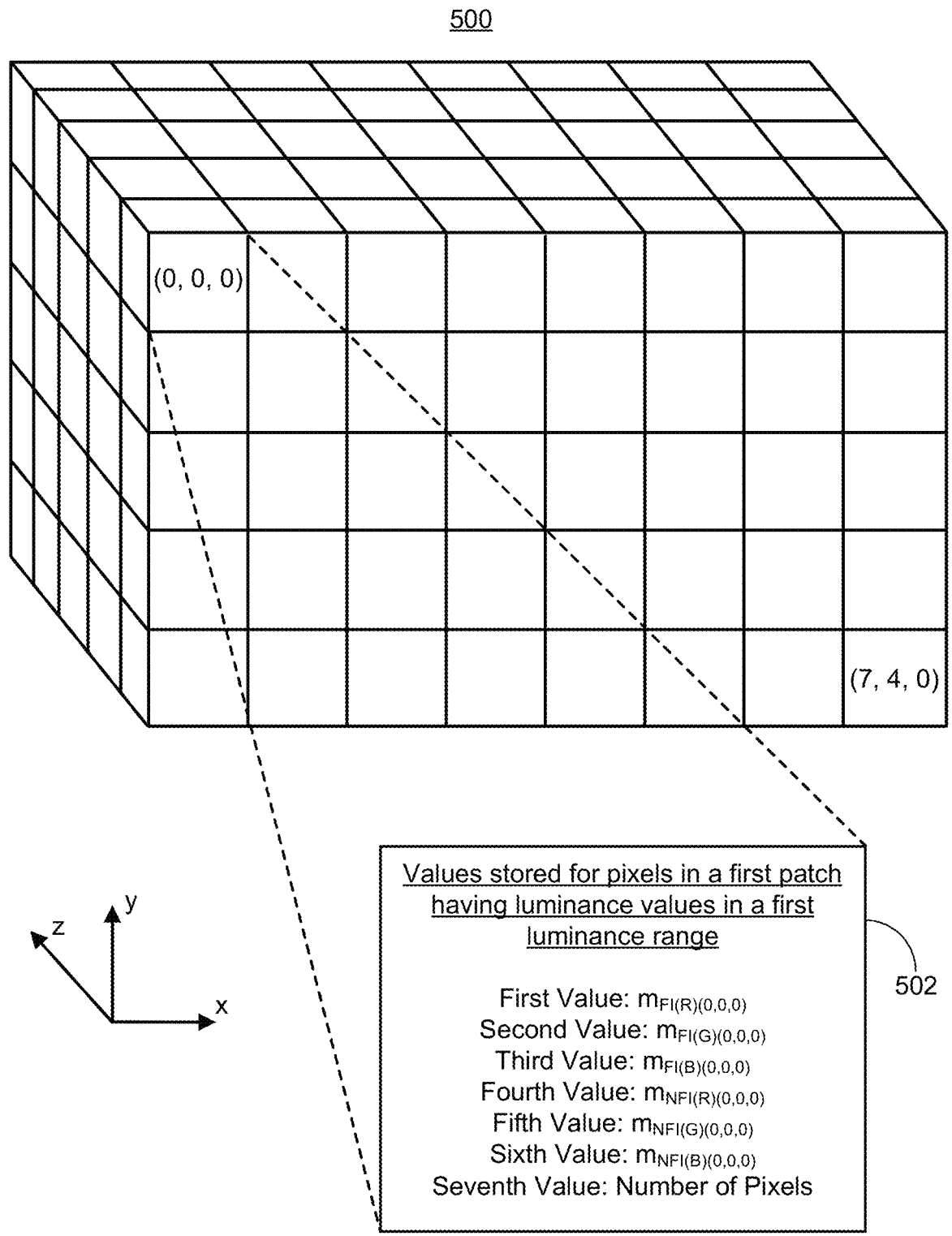
FIG. 5A illustrates an example of a three-dimensional grid for storing pixel values for a flash image and a no-flash image, in accordance with some examples.
Figure 5B:
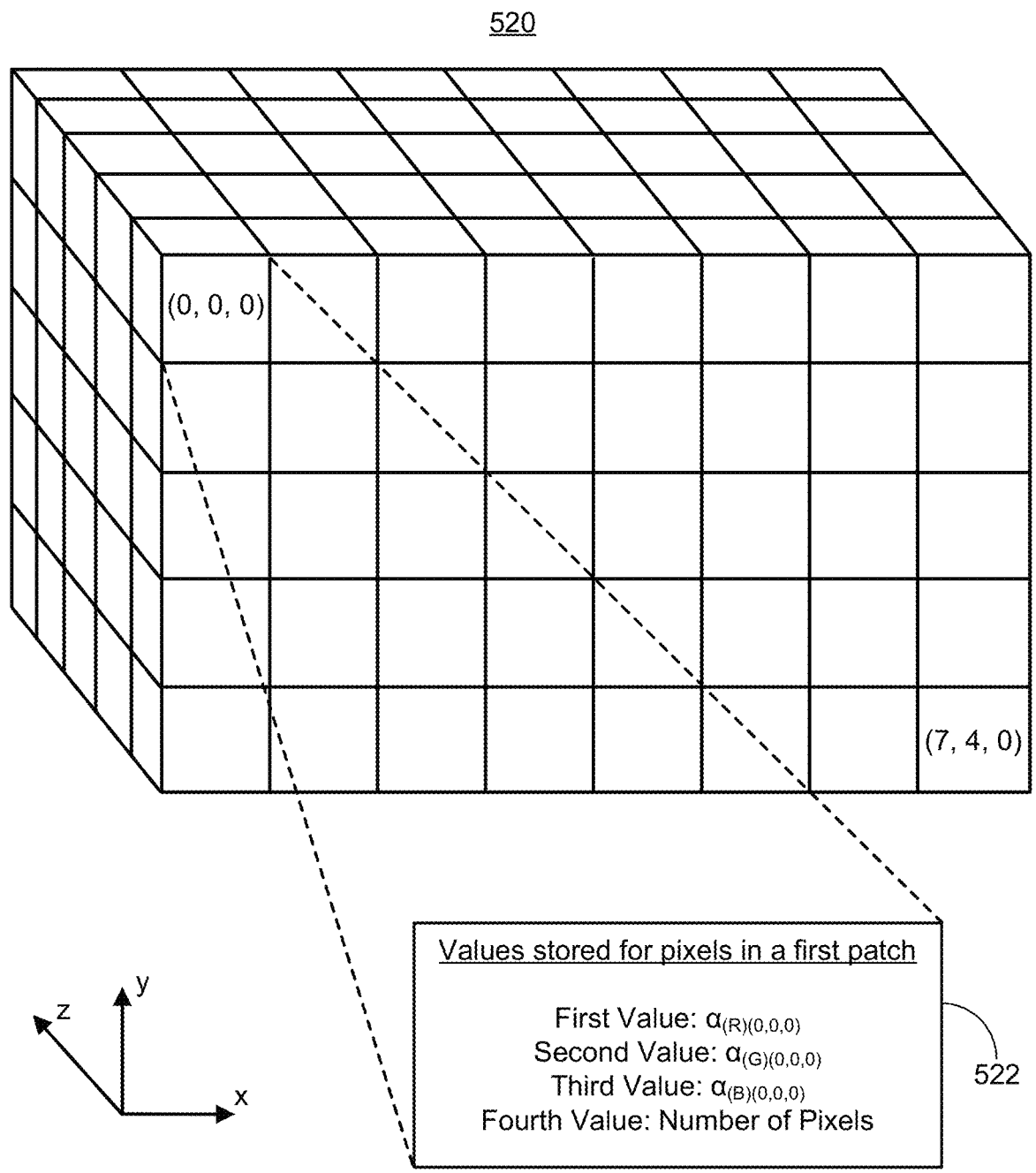
FIG. 5B illustrates an example of a three-dimensional grid for storing brightness adjustment parameter values for tonal mapping color information between a flash image and a no-flash image, in accordance with some examples.

FIG. 5B illustrates an example of a secondary 3D grid 520 populated with a values calculated based on the pixel values (e.g., the means or averages of each color component of flash image 112 and no-flash image 114) calculated and stored in the primary 3D grid 500 shown in FIG. 5A, which can be used by the tone mapping engine 104 to generate an output image as described with respect to process 200 shown in FIG. 2. The secondary 3D grid 520 can be the same size and structure as the primary 3D grid 500. The secondary 3D grid 520 can be generated in block 208 of process 200, and the α values for a cell $c_k$ in the secondary 3D grid 520 can be calculated from the pixel values for each color component (e.g., R, G, B of an RGB image) stored in a corresponding cell $c_i$ of the primary 3D grid 500.

The secondary 3D grid 520 in this example has a depth of 5 layers, resulting in the secondary 3D grid 520 having a dimension of 8×5×5. Each cell $c_i$ in the secondary 3D grid 520 corresponds to a cell $c_i$ in the primary 3D grid 500 and/or a same patch of pixels as the cell $c_i$ in the primary 3D grid 500. For example, cell 522 at location (0, 0, 0) in the secondary 3D grid 520 can correspond to cell 502 at location (0, 0, 0) in the primary 3D grid 500 and/or a same patch of pixels as the cell 502 in the primary 3D grid 500.

Moreover, each cell $c_k$ in the secondary 3D grid 520 can store α values for each color component (e.g., R, G, B of an RGB image) in a patch of pixels corresponding to that cell $c_k$, as well as a number of pixels associated with that cell $c_k$. The α values in the cell $c_k$ can be calculated by performing the iterative tonal mapping algorithm and tonal mapping equation (e.g., Equation 2) using the pixel values for each color component stored in a corresponding cell $c_i$ of the primary 3D grid 500. For example, the α values in cell 522 can include $\alpha_R$, $\alpha_G$, and $\alpha_B$ values calculated using the pixel values (e.g., the means or averages) stored in cell 502 (corresponding to cell 522) of the primary 3D grid 500 corresponding to the red (R), green (G), and blue (B) color components of a patch of pixels associated with cell 502 (and 522). To illustrate, $\alpha_R$ in cell 522 can be calculated using the values for the R channels of the flash image 112 and the no-flash image 114 stored in the primary 3D grid 500, $\alpha_G$ in cell 522 can be calculated using the values for the G channels of the flash image 112 and the no-flash image 114 stored in the primary 3D grid 500, and $\alpha_B$ in cell 522 can be calculated using the values for the B channels of the flash image 112 and the no-flash image 114 stored in the primary 3D grid 500.

Once the primary 3D grid 500 and the secondary 3D grid 520 are created populated with the respective cell values as described above, the tonal mapping engine 104 can perform the tonal mapping between the flash image 112 and the no-flash image 114 to generate a tone-mapped image as described in blocks 210 through 216 of process 200.

Figure 6:
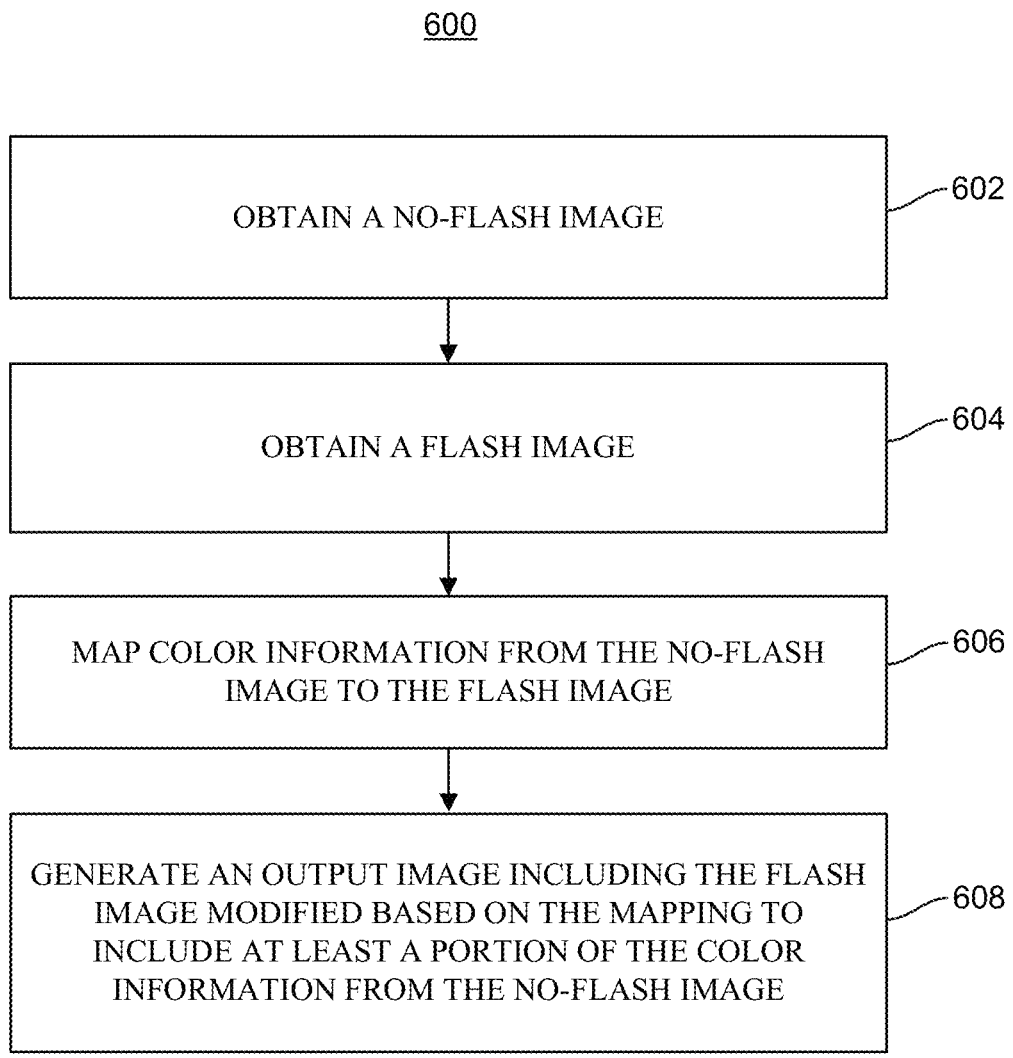
FIG. 6 illustrates an example method for processing a flash image and performing tonal mapping between the flash image and a no-flash image, in accordance with some examples.

FIG. 6 illustrates an example method 600 for localized tonal mapping between a flash image (112) and a no-flash image (114). At step 602, the image processing system 102 can obtain a no-flash image (114). In some examples, the no-flash image (114) can be an image captured by an image source (110), such as an image sensor or camera device, with a flash setting disabled, without a flash setting enabled, without a flash function, etc. At step 604, the image processing system 102 can also obtain a flash image (112). In some examples, the flash image (112) can be an image captured by the image source (110) with the flash setting enabled, without a flash setting being disables, with a flash function, etc.

At step 606, the image processing system 102 can map color information from the no-flash image (114) to the flash image (112). The image processing system 102 can map the color information using a tonal mapping engine (104) configured to perform a tonal mapping process (e.g., process 200 shown in FIG. 2). In some examples, the image processing system 102 can perform localized tonal mapping using a primary data structure (e.g., primary 3D grid 500) and a secondary data structure (e.g., secondary 3D grid 520).

For example, the image processing system 102 can create a primary 3D grid (500) and populate each cell $c_i$ with means or averages of each color component in a corresponding patch of pixels from each of the flash image (112) and the no-flash image (114). In some cases, the primary 3D grid (500) can include two spatial dimensions (x, y) and a luminance dimension (z). The spatial and luminance dimensions can be used to associate specific patches of pixels in the flash image (112) and the no-flash image (114) to specific cells in the primary 3D grid (500). The cell c, can then store averages or means calculated for each color component of its associated patch of pixels from the flash image (112) and the no-flash image (114).

In addition, the image processing system 102 can create a secondary 3D grid (520) and populate each cell $c_k$ in the secondary 3D grid (520) with optimal brightness altering parameters ($\alpha$) that can be applied to the values in the cells of the primary 3D grid (500) using a tonal mapping equation (e.g., Equation 1) to perform the localized tonal mapping. The secondary 3D grid (520) can have the same size and structure as the primary 3D grid (500). For example, like the primary 3D grid (500), the secondary 3D grid (520) can include two spatial dimensions (x, y) and a luminance dimension (z), as well as a same number of cells or layers of cells along each of the three dimensions (x, y, z).

Moreover, each cell $c_k$ in the secondary 3D grid (520) corresponds to a respective cell $c_i$ in the primary 3D grid (500) and a respective patch of pixels from the flash image (112) and the no-flash image (114). In other words, each pair of corresponding cells from the primary 3D grid (500) and the secondary 3D grid (520) can be associated with a same patch of pixels from the flash image (112) and the no-flash image (114). Each cell $c_k$ in the secondary 3D grid (520) can store the brightness altering parameters ($\alpha$) calculated for the patch of pixels corresponding to that cell $c_k$.

The brightness altering parameters (a) can include a brightness altering parameter for each color component (e.g., $\alpha_R$, $\alpha_G$, $\alpha_B$ in the case of an RGB image) in the corresponding patch of pixels from each of the flash image (112) and the no-flash image (114). Moreover, the brightness altering parameters for a cell $c_k$ in the secondary 3D grid (520) can be computed using a tone mapping or approximation equation, such as Equation 2, and the values stored in a corresponding cell $c_i$ in the primary 3D grid (e.g., the means or averages for each color component in the cell's corresponding patch of pixels from each of the flash and no-flash images). For example, the brightness altering parameters for cell (0, 0, 0) in the secondary 3D grid (520) can be computed by iteratively applying the means or averages values in the cell (0, 0, 0) of the primary 3D grid (500) in Equation 2 until optimal brightness parameters are obtained.

In some cases, the brightness altering parameters associated with a cell $c_k$ in the secondary 3D grid (520) and the brightness altering parameters associated with one or more neighboring cells can be interpolated to generate a final set of brightness altering parameters. For example, the image processing system 102 can interpolate the brightness altering parameters associated with a cell $c_k$ in the secondary 3D grid (520) and the nearest cell(s) in the secondary 3D grid (520) to obtain the $\alpha$ values that will be used for tonal mapping. In some cases, the $\alpha$ values associated with the cell $c_k$ and the one or more neighboring cells can be interpolated based on the distance of a pixel p from the center of every cell, including the pixel's corresponding cell of the secondary 3D grid and one or more of the nearest neighboring cells in the secondary 3D grid.

In one illustrative example, if the cells are 21×21 pixels in the x and y directions, then a pixel at location (11, 11) in a cell c0 is the center pixel p. For tonal mapping a pixel at location (15, 20), the distance to the center in the x direction is 4 (15 minus 11) and the distance to the center in the y direction is 9 (20 minus 11). For the x direction, because 15>11, the cell after cell c0 in the x direction can be considered as the nearest neighbor. For the y direction, because 20>11, the cell after cell c0 in the y direction can be considered as the nearest neighbor. The same can apply to the z direction (luminance). In some cases, the interpolated $\alpha$ values can then be determined as the weighted average of the values in the cell c0 and the values in the nearest neighbor cells. The weights used for the weighted average can be inversely proportional to the distances, in which case a higher weight can be used for values in the cells that have a center with a shorter distance to the pixel for which tonal mapping is being performed.

The outputs of the interpolation can include $\alpha$ values for each color component. For example, in the case of an RGB image, the outputs can include $\alpha_R$, $\alpha_G$, $\alpha_B$ values. The $\alpha$ values from the interpolation can then be used to perform tonal mapping as described herein.

In some cases, prior to creating the primary 3D grid (500), the image processing system 102 can optionally align and/or down-sample the flash image (112) and the no-flash image (114). The down-sampling can be done to reduce the number of calculations performed to populate the primary 3D grid. Moreover, in some cases, after creating and populating the primary 3D grid (500), the image processing system 102 can optionally apply a 3D filter to the primary 3D grid (500) in order to smooth out the values in the grid cells.

Once the primary and secondary 3D grids (500, 520) have been created and populated, the image processing system 102 (using the tonal mapping engine 104) can perform the localized tonal mapping using the values stored in the primary and secondary 3D grids (500, 520), as previously described with respect to FIGS. 2, 5A, and 5B.

At step 608, the image processing system 102 can generate an output image (e.g., a tone-mapped image) including the flash image (112) modified based on the mapping to include at least a portion of the color information from the no-flash image (114). The image processing system 102 can generate the output image based on a localized tonal mapping algorithm. Moreover, the image processing system 102 can generate the output image based on the values in the primary 3D grid (500) and the secondary 3D grid (520).

For example, the image processing system 102 can apply a tonal mapping equation, such as Equation 2, to adjust the pixel values associated with the flash image (112) based on the brightness altering parameters in the secondary 3D grid (520), and generate a modified flash image having adjusted color information matching, or significantly similar to, the color information in the no-flash image (114).

Figure 7:
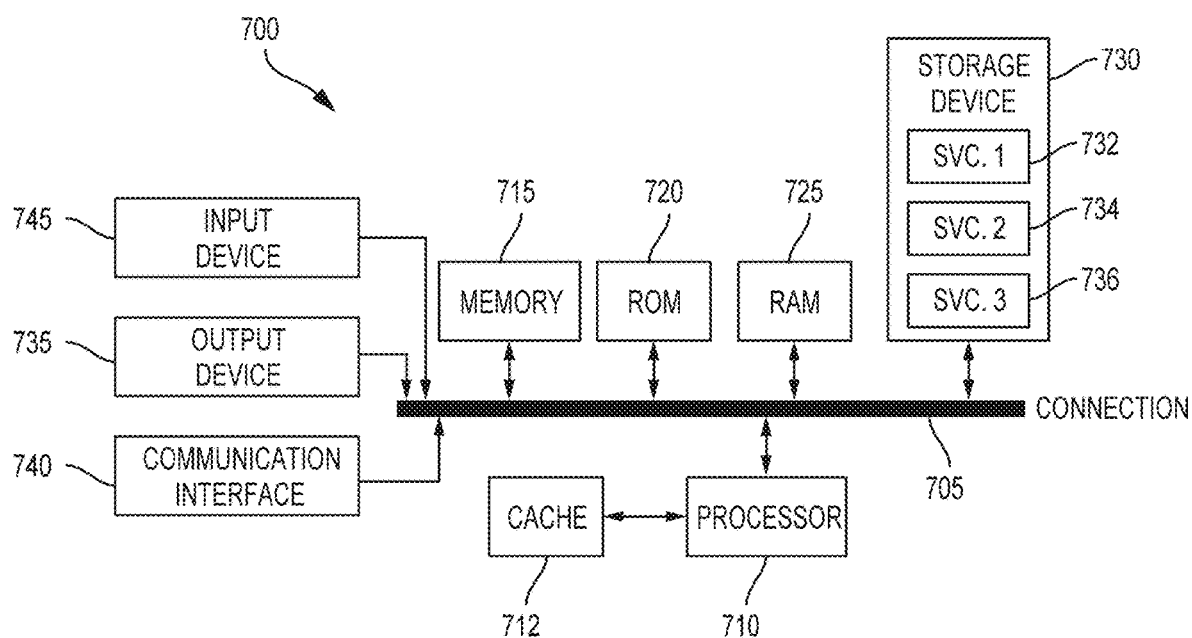
FIG. 7 illustrates an example computing device architecture, in accordance with some examples.

FIG. 7 illustrates an example computing device architecture 700 of an example computing device which can implement the various techniques described herein. For example, the computing device architecture 700 can implement the image processing system 102 shown in FIG. 1 and perform the tonal mapping techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
obtaining a no-flash image;
obtaining a flash image;
mapping color information from the no-flash image to the flash image, wherein each pixel in the flash image is mapped to at least a portion of the color information from the no-flash image using a first subset of pixels in the flash image and a second subset of pixels in the no-flash image;
wherein the color information comprises at least one of a color value and a brightness value, wherein mapping the color information from the no-flash image to the flash image comprises applying a tonal mapping algorithm to the flash image, the tonal mapping algorithm mapping color components between the no-flash image and the flash image using a three-dimensional grid populated with the color components, the three-dimensional grid comprising a horizontal dimension, a vertical dimension, and a luminance dimension, and
wherein each layer comprises a plurality of cells, each cell being populated with at least one color characteristic from the flash image and at least one color characteristic from the no-flash image, and wherein a first cell from the plurality of cells includes one or more color characteristics associated with a first respective set of pixel values from the flash image and one or more color characteristics associated with a second respective set of pixel values from the no-flash image; and generating an output image, the output image comprising one or more pixels of the flash image modified based on the mapping to include at least a portion of the color information from one or more pixels of the no-flash image.

2. The method of claim 1, wherein the three-dimensional grid comprises a plurality of layers of cells, each layer corresponding to a different combination of horizontal, vertical, and luminance values associated with the horizontal dimension, the vertical dimension, and the luminance dimension.

3. The method of claim 1, further comprising:
aligning the flash image and the no-flash image; and
generating the three-dimensional grid based on a result of the aligning of the flash image and the no-flash image.

4. The method of claim 1, further comprising at least one of down-sampling the flash image and the no-flash image prior to generating the three-dimensional grid and applying one or more three-dimensional filters to the three-dimensional grid.

5. The method of claim 1, wherein each layer of the three-dimensional grid corresponds to a different range of luminance values.

6. The method of claim 1, wherein the first respective set of pixel values corresponds to a first respective patch of pixels in the flash image and the second respective set of pixel values corresponds to a second respective patch of pixels in the no-flash image, and wherein the first respective patch of pixels in the flash image and the second respective patch of pixels in the no-flash image are mapped to the first cell based on a location and luminance associated with the first respective patch of pixels and a location and luminance associated with the second respective patch of pixels.

7. The method of claim 6, wherein the one or more color characteristics associated with the first respective set of pixel values from flash image include at least a first pixel value average of the first respective set of pixel values, and wherein the one or more color characteristics associated with the second respective set of pixel values from the no-flash image include at least a second pixel value average of the second respective set of pixel values.

8. The method of claim 7, wherein the first cell further includes an indication of a number of pixels in at least one of the first respective patch of pixels and the second respective patch of pixels.

9. The method of claim 8, further comprising:
generating a second three-dimensional grid for mapping the color information from the no-flash image to the flash image, the second three-dimensional grid comprising a second plurality of cells, the second plurality of cells comprising a same number of cells as the three-dimensional grid, wherein each respective cell of the three-dimensional grid corresponds to a different respective cell of the second three-dimensional grid;
calculating one or more weights for each pixel value average in each respective cell of the three-dimensional grid, wherein a weight of a first pixel value average associated with the first cell of the three-dimensional grid, when applied to the first pixel value average associated with the first cell, adjusts a first color associated with the first pixel value average within a similarity to a second color associated with a second pixel value average associated with the first cell, wherein the first pixel value average and the second pixel value average are associated with a same color component in the first respective patch of pixels in the flash image and the second respective patch of pixels in the no-flash image; and
storing, in the second three-dimensional grid, the one or more weights calculated for each pixel value average, the one or more weights being stored in the different respective cell corresponding to the respective cell of the three-dimensional grid.

10. The method of claim 9, further comprising storing the indication of the number of pixels in at least one of the first respective patch of pixels and the second respective patch of pixels.

11. The method of claim 9, wherein mapping color information from the no-flash image to the flash image and generating the output image comprises:
for each of a plurality of pixels in the flash image, identifying a corresponding cell in the second three-dimensional grid;
interpolating weights included in the corresponding cell and one or more neighboring cells, the weights being interpolated based on a number of pixels associated with the corresponding cell and the one or more neighboring cells and a distance associated with at least one of the corresponding cell and the one or more neighboring cells;
based on the weights interpolated, modifying pixel values of each of the plurality of pixels in the flash image; and
generating the output image based on the pixel values modified.

12. An apparatus for processing one or more images, the apparatus comprising:
memory configured to store data; and
one or more processors configured to:
obtain a no-flash image;
obtain a flash image;
map color information from the no-flash image to the flash image, wherein each pixel in the flash image is mapped to at least a portion of the color information from the no-flash image using a first subset of pixels in the flash image and a second subset of pixels in the no-flash image;
wherein the color information comprises at least one of color values and brightness values, wherein mapping the color information from the no-flash image to the flash image comprises applying a tonal mapping algorithm to the flash image, the tonal mapping algorithm mapping color components between the no-flash image and the flash image using a three-dimensional grid populated with the color components, the three-dimensional grid comprising a horizontal dimension, a vertical dimension, and a luminance dimension, and
wherein each layer comprises a plurality of cells populated with at least one color characteristic from the flash image and at least one color characteristic the no-flash image, and wherein a first cell from the plurality of cells includes one or more color characteristics associated with a first respective set of pixel values associated with the flash image and one or more color characteristics associated with a second respective set of pixel values associated with the no-flash image; and
generate an output image comprising the flash image modified based on the mapping to include at least a portion of the color information from the no-flash image.

13. The apparatus of claim 12, wherein the one or more processors are further configured to:
align the flash image and the no-flash image; and generate the three-dimensional grid based on a result of the aligning and down-sampling of the flash image and the no-flash image.

14. The apparatus of claim 12, wherein the one or more processors are further configured to apply one or more three-dimensional filters to the three-dimensional grid.

15. The apparatus of claim 12, wherein the three-dimensional grid comprises a plurality of layers of cells, each layer corresponding to a different combination of horizontal, vertical and luminance values associated with the horizontal dimension, the vertical dimension, and the luminance dimension.

16. The apparatus of claim 15, wherein each layer of the three-dimensional grid corresponds to a different range of luminance values.

17. The apparatus of claim 12, wherein the first respective set of pixel values corresponds to a first respective patch of pixels in the flash image and the second respective set of pixel values corresponds to a second respective patch of pixels in the no-flash image, and wherein the first respective patch of pixels in the flash image and the second respective patch of pixels in the no-flash image are mapped to the first cell based on a location and luminance associated with the first respective patch of pixels and a location and luminance associated with the second respective patch of pixels.

18. The apparatus of claim 17, wherein the first cell further includes an indication of a number of pixels in at least one of the first respective patch of pixels and the second respective patch of pixels.

19. The apparatus of claim 18, wherein the one or more processors are configured to:
generate a second three-dimensional grid for mapping the color information from the no-flash image to the flash image, the second three-dimensional grid comprising a second plurality of cells, the second plurality of cells comprising a same number of cells as the three-dimensional grid, wherein each respective cell of the three-dimensional grid corresponds to a different respective cell of the second three-dimensional grid;
calculate one or more weights for each pixel value average in each respective cell of the three-dimensional grid, wherein a weight for a first pixel value average associated with the first cell of the three-dimensional grid, when applied to the pixel value average associated with the first cell, adjusts a first color associated with the pixel value average within a similarity to a second color associated with a second pixel value average associated with the first cell of the three-dimensional grid, wherein the first pixel value average and the second respective pixel value average are associated with a same color component in the first respective patch of pixels in the flash image and the second respective patch of pixels in the no-flash image; and
store, in the second three-dimensional grid, the one or more weights calculated for each pixel value average, the one or more weights being stored in the different respective cell corresponding to the respective cell of the three-dimensional grid.

20. The apparatus of claim 19, the one or more processors being further configured to store the indication of the number of pixels in at least one of the first respective patch of pixels and the second respective patch of pixels.

21. The apparatus of claim 19, wherein mapping color information from the no-flash image to the flash image and generating the output image comprises:
for each of a plurality of pixels in the flash image, identifying a corresponding cell in the second three-dimensional grid;
interpolating weights included in the corresponding cell and one or more neighboring cells, the weights being interpolated based on a number of pixels associated with the corresponding cell and the one or more neighboring cells and a distance associated with at least one of the corresponding cell and the one or more neighboring cells;
based on the weights interpolated, modifying pixel values of each of the plurality of pixels in the flash image; and
generating the output image based on the pixel values modified.

22. The apparatus of claim 12, further comprising a mobile device.

23. The apparatus of claim 12, further comprising a display for displaying one or more images.

24. The apparatus of claim 12, further comprising an image capturing device.

25. A non-transitory computer-readable storage medium for processing one or more images, the non-transitory computer-readable storage medium comprising:
instructions stored thereon which, when executed by one or more processors, cause the one or more processors to:
obtain a no-flash image;
obtain a flash image;
map color information from the no-flash image to the flash image, wherein each pixel in the flash image is mapped to at least a portion of the color information from the no-flash image using a first subset of pixels in the flash image and a second subset of pixels in the no-flash image;
wherein the color information comprises at least one of color values and brightness values, wherein mapping the color information from the no-flash image to the flash image comprises applying a tonal mapping algorithm to the flash image, the tonal mapping algorithm mapping color components between the no-flash image and the flash image using a three-dimensional grid populated with the color components, the three-dimensional grid comprising a horizontal dimension, a vertical dimension, and a luminance dimension, and
wherein each layer comprises a plurality of cells populated with at least one color characteristic from the flash image and at least one color characteristic the no-flash image, and wherein a first cell from the plurality of cells includes one or more color characteristics associated with a first respective set of pixel values associated with the flash image and one or more color characteristics associated with a second respective set of pixel values associated with the no-flash image; and
generate an output image comprising the flash image modified based on the mapping to include at least a portion of the color information from the no-flash image.

* * * * *